United States Patent Office 2,888,489
Patented May 26, 1959

2,888,489

POLYGLYCOL ETHER SURFACE-ACTIVE AGENTS

Lee H. Horsley and Edgar C. Britton, Midland, Mich., assignors to The Dow Chemical Company, Midland, Mich., a corporation of Delaware No Drawing. Application January 24, 1957
Serial No. 635,964

16 Claims. (Cl. 260—613)

This invention relates to new monoethers of polyoxyalkylene glycols.

The compounds of the invention correspond to the formula $$RO-X-O-(Alkylene-O)_n-H$$

wherein R is an unsubstituted alkyl radical containing 2 to 18 carbon atoms or a phenyl, alkylphenyl or chlorinated phenyl radical, X is a phenylethylene radical, $$-\underset{\underset{C_6H_5}{|}}{CH}-CH_2-$$

(alkylene-O)$_n$ is a polyoxyalkylene chain wherein the alkylene radicals are vicinal alkylene radicals and each contains 2 to 4 carbon atoms and $n$ is a number in the range of about 5 to 50. By vicinal alkylene radicals we means those having points of attachment on adjacent carbon atoms. Such radicals include —CH$_2$CH$_2$—, —CH$_2$CH(CH$_3$)—, —CH$_2$CH(C$_2$H$_5$)— and $$-CH(CH_3)CH(CH_3)-$$

but not —CH$_2$CH$_2$CH$_2$— or —CH$_2$CH$_2$CH(CH$_3$)—.

The above-defined compounds are synthetic lubricants or surface-active materials having exceptional utility as wetting agents, emulsifiers, detergents or antifoam agents, depending on the particular compound used.

While the compounds corresponding to the above formula may be made by any suitable process, a preferred process comprises reacting styrene oxide and a monohydric alcohol or phenol, ROH, whereby a styrene glycol monoether is formed, and then reacting said monoether with the appropriate alkylene oxide or oxides. Alternatively, styrene glycol can be consecutively etherified with the alcohol, ROH, and with the polyoxyalkylene glycol, HO(alkylene-O)$_n$—H. Other methods for making the compounds will be apparent to those skilled in the art.

The following examples illustrate the practice of the invention.

EXAMPLE 1

*Step 1.—Reaction of tridecyl alcohol with styrene oxide*

Ten grams of solid KOH were dissolved in 825 g. (4.125 m.) of oxo-process tridecyl alcohol. The solution was then maintained at 150–160° C. while 600 g. (5 m.) of styrene oxide were added. The product was distilled to produce 478 g. of tridecyl monoether of styrene glycol, boiling point 185–195° C./3 mm.; $N_D^{25}$, 1.5010; $d_{25}^{25}$, 0.9580; and OH analysis, 4.98 percent (theor., 5.30).

*Step 2.—Addition of alkylene oxide*

Two grams of KOH were dissolved in 116 g. (0.362 m.) of the product of Step 1 and the resulting solution was maintained at 100–125° C. while 190 g. (4.34 m.) of ethylene oxide were reacted with it. The product was neutralized with carbon dioxide and filtered. It was a soft tan wax, highly soluble in water and possessing valuable surfactant properties.

Instead of the tridecyl alcohol used in the above example we may use other alkanols containing 2 to 18 carbon atoms, phenol, alkylphenols or chlorophenols. Instead of the ethylene oxide we may use 1,2-propylene oxide, 1,2 or 2,3-butylene oxide or mixtures of any of these oxides. When more than one oxide is to be used in a compound they may be reacted separately, in sequence, or they may be mixed and reacted simultaneously. Instead of the KOH used as catalyst, we may use any alkaline catalyst such as the alkali and alkaline earth metal alkoxides, oxides, or hydroxides or tert.-alkyl amines. The reaction temperature is preferably in the range of about 100–180° C. and the pressure is preferably about 0 to 50 pounds per square inch, guage.

Tables I and II show some typical products illustrative of the invention, together with some of their physical and chemical properties. The data in Table II show the wide range of surfactant properties obtainable by suitable choice of the hydroxyl reactant, ROH, and by varying the size and number of oxyalkylene groups in the polyoxyalkylene chain. Thus, the compounds of Examples 1–3 are excellent detergents and wetting and emulsifying agents while those of Examples 4 and 5 are substantially insoluble in water but are powerful anti-foam agents. Similarly, the products of Examples 6–8 and 12 are good wetting agents while those of Examples 9–11 are poor wetting agents but are good emulsifiers. That of Example 9 is an especially valuable emulsifier for use in surface-coating products, such as latex paints.

TABLE I.—COMPOUNDS RO—X—O—(ALKYLENE-O)$_n$—H

| Ex. No. | R | Moles Alkylene Oxides* | | | Percent OH | $N_D^{25}$ | $d_{25}^{25}$ |
|---|---|---|---|---|---|---|---|
| | | BO | PO | EO | | | |
| 1 | Tridecyl | | | 12 | 2.54 | | |
| 2 | do | | | 16 | 1.77 | | |
| 3 | Octyl | | | 16 | 2.09 | | |
| 4 | do | | 8 | | 3.70 | 1.4710 | 0.9950 |
| 5 | do | | | | 4.55 | 1.4750 | 0.9713 |
| 6 | do | 5 | | | 3.08 | 1.4728 | 1.0280 |
| 7 | do | 5 | | 10 | 3.28 | 1.4750 | 1.0255 |
| 8 | do | | 5 | 5 | 3.15 | 1.4740 | 1.0218 |
| 9 | Ethyl | | | 10 | 3.00 | | |
| 10 | Phenyl | | | 10 | 2.70 | 1.5079 | 1.1270 |
| 11 | do | | | 30 | 2.32 | Solid | Solid |
| 12 | Di Sec. Butylphenyl | | | 10 | 2.51 | 1.5050 | 1.0710 |
| 13 | do | | 5 | 10 | 2.62 | 1.4902 | 1.0510 |
| 14 | 2,4-Dichlorophenyl | | | 10 | 3.49 | 1.5177 | 1.1827 |

*Moles of 1,2-butylene oxide (BO), 1,2-propylene oxide (PO) and/or ethylene oxide (EO) used in forming the polyoxyalkylene chain. Where two alkylene oxides were used, the addition was consecutive, with the ethylene oxide being added last, except for Example 8, where the two oxides were added simultaneously.

TABLE II.—SURFACTANT PROPERTIES OF THE COMPOUNDS OF TABLE I

| Ex. No. | Cloud Pt., °C., 10 percent solution | Surface Tension, Dynes/cm., 0.1 percent solution | Ross-Miles Foam Test, Foam Ht. in mm. | | Synthron Tape Modif. of Draves Wetting Test, Wetting Time in Min. |
|---|---|---|---|---|---|
| | | | 0 Min. | 5 Min. | |
| 1 | 25 | 30.3 | 38 | 38 | 0.35 |
| 2 | 60 | 30.7 | 88 | 88 | 0.25 |
| 3 | 78 | 33.7 | 119 | 109 | 0.32 |
| 4 | insol. | | | | |
| 5 | insol. | | | | |
| 6 | 20 | 31.5 | 48 | 23 | 0.50 |
| 7 | 1 | 31.4 | 16 | 6 | 0.49 |
| 8 | 3 | 32.9 | 5 | 3 | 0.63 |
| 9 | 96 | 55.8 | 40 | 10 | >10 |
| 10 | 66 | 43.6 | 15 | 1 | >10 |
| 11 | 82 | 44.5 | 20 | 5 | >10 |
| 12 | 56 | 32.7 | 39 | 39 | 0.35 |
| 13 | 26 | 33.2 | 13 | 13 | 1.84 |
| 14 | 19 | 39.0 | 55 | 35 | 1.23 |

We claim:

1. A compound corresponding to the formula

RO—X—O—(Alkylene-O)$_n$—H wherein R is a radical selected from the group consisting of unsubstituted alkyl radicals containing 2 to 18 carbon atoms, phenyl, alkylphenyl containing not more than two alkyl substituents and a total of not more than 8 carbon atoms in such substituents and chlorinated phenyl radicals containing not more than two chlorine substituents; X is a phenylethylene radical; (alkylene-O)$_n$ is a polyoxyalkylene chain wherein the alkylene radicals are vicinal alkylene radicals and each contains 2 to 4 carbon atoms and $n$ is a number in the range of about 5 to 50.

2. A compound as defined in claim 1 wherein R is an alkyl radical.

3. A compound as defined in claim 2 wherein R is an ethyl radical.

4. A compound as defined in claim 2 wherein R is an octyl radical.

5. A compound as defined in claim 2 wherein R is a tridecyl radical.

6. A compound as defined in claim 1 wherein R is a phenyl radical.

7. A compound as defined in claim 1 wherein R is an alkylphenyl radical.

8. A compound as defined in claim 7 wherein R is a di-sec.-butylphenyl radical.

9. A compound as defined in claim 1 wherein the polyoxyalkylene chain comprises oxyethylene radicals.

10. A compound as defined in claim 9 wherein the polyoxyalkylene chain consists of oxyethylene radicals.

11. A compound as defined in claim 9 wherein the polyoxyalkylene chain (alkylene-O)$_n$ corresponds to the formula (C$_3$H$_6$O)$_y$—(C$_2$H$_4$O)$_z$ wherein $y$ and $z$ are integers such that their sum equals $n$.

12. A composition as defined in claim 9 wherein the polyoxyalkylene chain consists of a random sequence of oxyethylene and oxypropylene radicals.

13. A composition as defined in claim 1 wherein the polyoxyalkylene chain consists of oxypropylene radicals.

14. A composition as defined in claim 1 wherein the polyoxyalkylene chain comprises oxybutylene radicals.

15. A composition as defined in claim 14 wherein the polyoxyalkylene chain (alkylene-O)$_n$ corresponds to the formula (C$_4$H$_8$O)$_p$—(C$_2$H$_4$O)$_q$ wherein $p$ and $q$ are integers such that their sum equals $n$.

16. A process for making the compound defined in claim 1 comprising reacting a monohydric compound ROH, wherein R is as defined in claim 1, with substantially one molar equivalent of styrene oxide, thus to form a mono-ether of styrene glycol, and then reacting said mono-ether with about 5 to 50 molar equivalents of at least one vicinal alkylene oxide wherein the alkylene radical contains 2 to 4 carbon atoms, said reactions being conducted in the presence of an alkaline catalyst, at a temperature in the range of about 100 to 180° C. and a pressure in the range of about 0 to 50 pounds per square inch, gauge.

References Cited in the file of this patent

UNITED STATES PATENTS

| 2,481,278 | Ballard et al. | Sept. 6, 1949 |
| 2,593,112 | Cross et al. | Apr. 15, 1952 |
| 2,641,614 | Britton et al. | June 9, 1953 |
| 2,677,700 | Jackson et al. | May 4, 1954 |

OTHER REFERENCES

Schwartz et al.: Surface Active Agents (1949), pg. 18, 19, 203, 204.

"Pluronic Grid," Chem. and Eng. News, Jan. 30, 1956, pgs. 477–480.